United States Patent [19]

Barletta et al.

[11] Patent Number: 4,951,817

[45] Date of Patent: Aug. 28, 1990

[54] BEEPER SLIP ON COVER

[76] Inventors: Anthony Barletta, 1876 69th St., Brooklyn, N.Y. 11204; Joseph V. Ottomanelli, 3826 Cypress Ave., Seagate, N.Y. 11224; George Spector, 233 Broadway, New York, N.Y. 10007

[21] Appl. No.: 413,087

[22] Filed: Sep. 27, 1989

[51] Int. Cl.[5] .............................................. B65D 85/38
[52] U.S. Cl. ...................................... 206/305; 206/37; 206/38; 206/573; 224/252
[58] Field of Search .................... 206/37, 38, 305, 573, 206/576, 556, 817, 328; 224/252

[56] References Cited

U.S. PATENT DOCUMENTS

| D. 163,078 | 4/1951 | White | 206/38 R |
|---|---|---|---|
| 1,648,565 | 11/1927 | Primley | 206/38 |
| 1,957,293 | 5/1934 | Reilly | 206/817 |
| 3,091,378 | 5/1963 | O'Dwyer | 224/252 |
| 3,244,981 | 4/1966 | Tatevasian | 206/38 |
| 3,992,776 | 11/1976 | Koppe | 224/252 |
| 4,071,065 | 1/1978 | Halbich | 206/305 |
| 4,299,344 | 11/1981 | Yamashita et al. | 224/252 |
| 4,420,078 | 12/1983 | Belt et al. | 224/253 |
| 4,558,783 | 12/1985 | Dangerfield et al. | 206/38 |
| 4,852,727 | 8/1989 | Oberle | 206/556 |

*Primary Examiner*—David T. Fidei

[57] ABSTRACT

A carrier for a portable electronic paging device is provided and consists of a receptacle formed out of protective material having an open top for closely receiving the paging device therewithin. The rear wall has a cutout area with an elastic band extending across the cutout area so that a mounting clip on the paging device can project therethrough and attach onto a belt of a person using the paging device.

3 Claims, 1 Drawing Sheet

BEEPER SLIP ON COVER

BACKGROUND OF THE INVENTION

The instant invention relates generally to carrying cases and more specifically it relates to a carrier for a portable electronic paging device which provides protection to a beeper when the beeper is clipped onto a belt.

There are available various conventional carrying cases which do not provide the novel improvements of the invention herein disclosed.

SUMMARY OF THE INVENTION

A primary object of the present invention is to provide a carrier for a portable electronic paging device that will overcome the shortcomings of the prior art devices.

Another object is to provide a carrier for a portable electronic paging device that will allow the paging device to be mounted onto a belt of a person which will protect the paging device while permitting the person to use the paging device.

An additional object is to provide a carrier for a portable electronic paging device in which a slide member having apertures will go into alignment with apertures in the front wall of the carrier when the paging device is inserted into the carrier so that sound from a speaker in the paging device can exit therefrom.

A further object is to provide a carrier for a portable electronic paging device that is simple and easy to use.

A still further object is to provide a carrier for a portable electronic paging device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
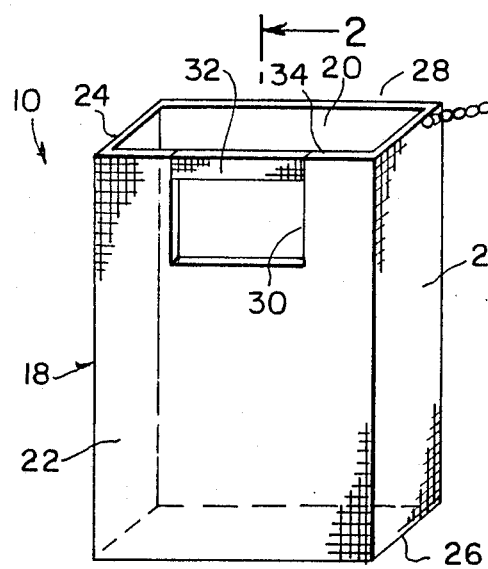
FIG. 1 is a rear perspective view of the invention.
Figure 2:
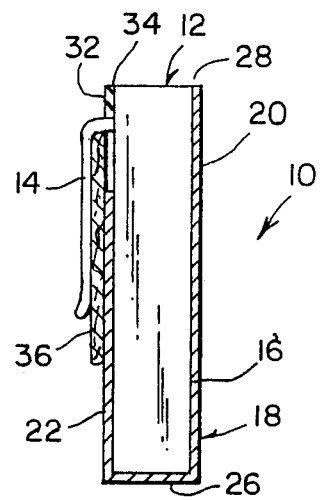
FIG. 2 is a cross sectional view taken along line 2—2 in FIG. 1, showing the clip of the paging device attached onto a belt.

Turning now descriptively to the drawings, in which similar reference characters denote similar elements throughout the several views, FIGS. 1 and 2 illustrate a carrier 10 for a portable electronic paging device beeper 12 of the type having a mounting clip 14 attached thereto and a speaker 16 therein. The carrier 10 includes a receptacle 18 formed out of protective material, such as leather, vinyl, cloth, etc. and has a front wall 20, a rear wall 2, a pair of side walls 24, a bottom wall 26 and an open top 28 for closely receiving the paging device 12 therewithin. The rear wall 22 has a cutout area 30 extending down from the open top 28 thereof.

An elastic band 32 extends across the cutout area 30 at upper edge 34 of the rear wall 22 so that the mounting clip 14 on the paging device 12 can project therethrough and attach onto a belt 36 of a person using the paging device 12. A decorative chain 38 can be attached to one of the side walls 24 to make the carrier 10 more fashionable.

Figure 3:
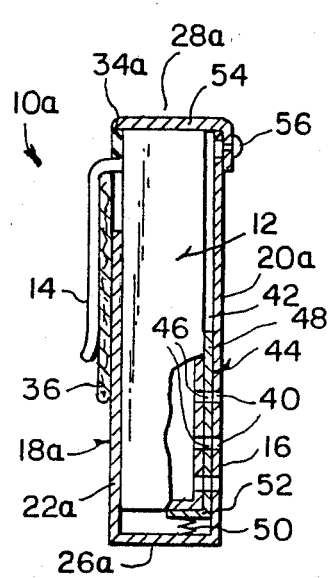
FIG. 3 is a cross sectional view similar to FIG. 2, showing a modification in which a slide member is provided to go down when the paging device is placed into the carrier so as to expose the holes in the front wall for speaker of the paging device to sound therethrough.
Figure 4:
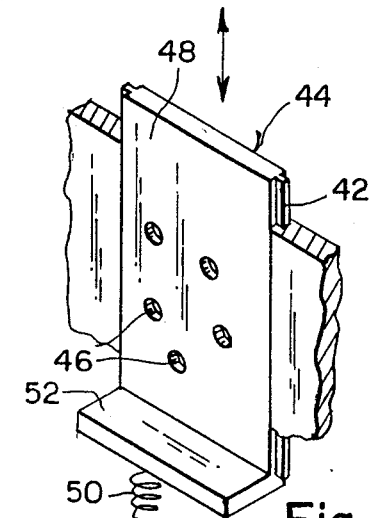
FIG. 4 is a perspective view of the slide member riding within a tongue and groove track within the carrier.

FIGS. 3 and 4 show a modified carrier 10a in which the front wall 20a of the receptacle 18a has a plurality of holes 40 therethrough and a track 42, such as a tongue and groove type therein. An L-shaped slide member 44 is provided having a plurality of holes 46 in its vertical long arm 48 which rides in the track 42. A spring 50 is disposed between the bottom wall 26a of the receptacle 18a and short leg 52 of the slide member 44. A cover 54 extends from the upper edge 34a of the rear wall 22a over the open top 28a thereof.

A fastener 56, shown as a snap, is for securing the cover 54 to the front wall 20a so that the paging device 12 placed within the receptacle 18a will press against the short arm 52 causing the slide member 44 to move down within the track 42, compressing the spring 50 and allowing the holes 46 in the long arm 48 of the slide member 44 to be in alignment with the holes 40 in the front wall 20a in which sound from the speaker 16 in the paging device will exit therefrom.

Figure 5:
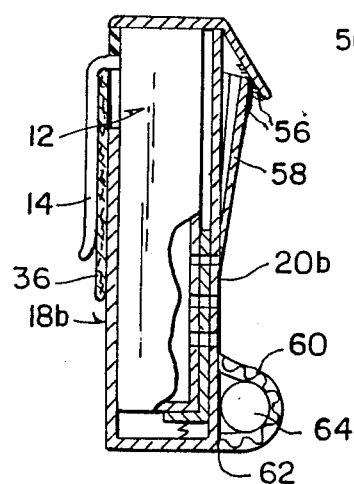
FIG. 5 is a cross sectional view similar to FIG. 3, showing another modification of the invention.

Another modified carrier 10b is shown in FIG. 5, and includes an accordion pouch 58 disposed on the front wall 20b of the receptacle 18b for holding coins and the like therein. The accordion pouch 58 is securely closed by the fastener 56 being in this case a hook and loop pile fastener. An elastic loop pouch 60 is carried near lower edge 62 of the front wall 20b of the receptacle 18b for holding a spare battery 64 therein.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A carrier adapted to receive a portable electronic paging device of the type having a mounting clip attached thereto and a speaker therein, said carrier comprising:
    (a) a receptacle having interconnected walls comprising spaced front and rear walls, a pair of spaced side walls, a bottom wall and a top opening adapted for closely receiving a paging device therewithin;
    (b) said rear wall having a cutout extending down from said top opening;
    (c) a band extending across said cutout along said top opening whereby said mounting clip on the paging device can project through said cutout below said band and attach onto a belt of a person using the paging device;
    (d) said front wall of said receptacle, having a plurality of holes therethrough and a track therein;

(e) an L-shaped slide member having a plurality of holes in a vertical long arm which rides in said track;
(f) a spring disposed between said bottom wall of said receptacle and a short arm of said slide member;
(g) a cover extending from an upper edge of said rear wall over said top opening; and
(h) a fastener for securing said cover to said front wall, so that the paging device can be placed within said receptacle to bear against said short arm causing said slide member to move down within said track, compressing said spring and allowing said holes in said long arm of said slide member to be in alignment with said holes in said front wall in which sound from the speaker in the paging device will exit therefrom.

2. A carrier as recited in claim 1, further including an accordion pouch disposed on said front wall of said receptacle for holding coins and the like therein, whereby said accordion pouch may be closed by said fastener.

3. A carrier as recited in claim 2, further including a pouch carried on said front wall for holding a spare battery therein.

* * * * *